US007152742B2

(12) United States Patent
Donaj et al.

(10) Patent No.: US 7,152,742 B2
(45) Date of Patent: Dec. 26, 2006

(54) SEPARATION PROCESS FOR CARPETS

(75) Inventors: Roland Donaj, Biebertal (DE); Wolfgang Dilly-Louis, Friedberg (DE); Rudolf Kämpf, Gründau (DE); Norman Schnittker, Neuberg (DE); Reinhard Wolf, Rodenbach (DE)

(73) Assignee: Zimmer AG, Frankfurt Main (DE)

( * ) Notice: Subject to any disclaimer, the term of this patent is extended or adjusted under 35 U.S.C. 154(b) by 191 days.

(21) Appl. No.: 10/466,667

(22) PCT Filed: Jan. 10, 2002

(86) PCT No.: PCT/EP02/00159

§ 371 (c)(1),
(2), (4) Date: Jan. 16, 2004

(87) PCT Pub. No.: WO02/057060

PCT Pub. Date: Jul. 25, 2002

(65) Prior Publication Data

US 2004/0094457 A1 May 20, 2004

(30) Foreign Application Priority Data

Jan. 19, 2001 (DE) ................................ 101 02 399

(51) Int. Cl.
*B03B 5/60* (2006.01)

(52) U.S. Cl. .......................... 209/176; 209/3; 209/173; 241/20; 241/21; 241/24.12; 241/24.17; 521/40; 521/49.8

(58) Field of Classification Search .................... 209/3, 209/173, 176; 241/24.1; 521/40
See application file for complete search history.

(56) References Cited

U.S. PATENT DOCUMENTS

| | | | | |
|---|---|---|---|---|
| 4,167,477 | A | 9/1979 | Valdez et al. | 209/166 |
| 5,598,980 | A * | 2/1997 | Dilly-Louis et al. | 241/20 |
| 5,653,867 | A * | 8/1997 | Jody et al. | 209/164 |
| 5,722,603 | A * | 3/1998 | Costello et al. | 241/20 |
| 6,752,336 | B1 * | 6/2004 | Wingard | 241/20 |

OTHER PUBLICATIONS

Wustenberg et al, "Material Recycling of Textile Floor Coverings", International Polymer Science and Technology, RAPRA Technologies, Shropshire, GB, vol. 21, No. 3, 1994, pp. T-1-T-9, XP000453788, ISSN: 0307-174X, p. 1-9.

* cited by examiner

*Primary Examiner*—Kathy Matecki
*Assistant Examiner*—Terrell Matthews
(74) *Attorney, Agent, or Firm*—Norris McLaughlin & Marcus PA

(57) ABSTRACT

Comminuted carpet pieces are fed to a first stirred tank together with an aqueous solution containing separating salt, to form a first suspension, which is fed to a first mechanical separating stage. A first high-solids phase, a second high-solids phase containing polymer fiber material, and a liquid phase are obtained therefrom. The second high-solids phase is mixed with a water-containing separation solution in a stirred tank, to give a second suspension, which is fed to a second mechanical separating stage. A third high-solids phase, a polymer fiber material-rich phase and a liquid phase are withdrawn therefrom. An acid which is stronger than $H_2CO_3$ is introduced into the stirred tank together with the water-containing separation solution, and the pH of the liquid in the stirred tank is adjusted to 2–6.

6 Claims, 1 Drawing Sheet

1 2 2a 2b 3 5a 5 6 7a 7 8 5b 9 11 10 12 13 14 16 21 17 22 20 25 26 24 27 31 28 22 30

SEPARATION PROCESS FOR CARPETS

This is a 371 of PCT/EP02/00159 filed 10 Jan. 2002 (international filing date).

The invention relates to a process for separating polymer fiber material from comminuted carpet pieces, which are fed to a first stirred tank together with an aqueous solution containing separating salt, and a first suspension is withdrawn from the first stirred tank and fed to a first mechanical separating stage, from which a first high-solids phase, a second high-solids phase containing polymer fiber material, and a liquid phase are separated off, the second high-solids phase being mixed with a water-containing separation solution in a second stirred tank, and a second suspension being withdrawn from the second stirred tank and fed to a second mechanical separating stage, from which a third high-solids phase, a polymer fiber material-rich phase, and a liquid phase are separated off.

BACKGROUND OF THE INVENTION

A process of this type is disclosed in EP 0681 896 B1. In this process, the carpet is wet-ground in two stages and separated into three fractions in two centrifuge separating stages connected in series.

SUMMARY OF THE INVENTION

The invention is based on the object of improving the known process and obtaining polymer fiber material, for example polyamide fibers, in the highest possible purity in an inexpensive manner. This is achieved in accordance with the invention in the process mentioned at the outset in that an acid which is stronger than $H_2CO_3$ is introduced into the second stirred tank together with the water-containing separation solution, and the pH of the liquid in the second stirred tank is adjusted to 2–6. Due to the acidification in the second stirred tank, residues of chalk are dissolved and can be separated off completely. Chalk-containing particles, in particular rubber particles, lower their specific gravity due to the dissolution of the chalk and can be discharged with the third high-solids phase through the mechanical separating stage. Suitable acids which are stronger than $H_2CO_3$ are, for example, nitric acid, hydrochloric acid, acetic acid or formic acid.

DETAILED DESCRIPTION

The separating salt fed to the first stirred tank is advantageously a calcium salt which is readily soluble in water and whose acid dissolves calcium carbonate. Suitable calcium salts are, for example, calcium nitrate and calcium chloride. However, it is alternatively also possible to use a readily soluble salt such as, for example, $K_2CO_3$.

One or both separating stages preferably operate with a double-cone full-jacket centrifuge. Before each centrifuge, a suspension whose solids concentration is in the range of 1–15% by weight and preferably 3–10% by weight is produced in the associated stirred tank. It is ensured that the density of the liquid phase of the suspension in the first separating stage is set to a value which is between the highest and second-highest density of the principal components of the carpet. In the second separating stage, the density of the liquid phase is between the lowest and the second-lowest density of the principal components of the carpet. The carpet component with the highest specific gravity is normally, due to the filler, the carpet backing material, with a density of about 1.5–3.5 kg per liter. The second-heaviest component is formed by the pile fibers, with a density of about 1.35 kg per liter for polyester and about 1.15 kg per liter for polyamide. Correspondingly, for example, the density of the liquid phase of the suspension in the first separating stage in the case of recovery of polyester fibers is set to a value in the range from about 1.36 to about 1.5 kg per liter and in the case of polyamides in the range from 1.16 to 1.3 kg per liter (at 20° C.). The separating salt used here plays an important role in setting the density of the first suspension. In the second stirred tank, the setting of the pH in the range 2–6 by addition of acid is also of importance in addition to the density. The addition of small amounts of less than 0.2 g per liter of a commercially available wetting agent and/or antifoam agent to the first and/or second stirred tank is advisable.

Particularly good separation results are achieved with the double-cone full-jacket screw centrifuge. With this commercially available apparatus, it is possible to separate the fraction of the solid having a higher density than the liquid phase from the fraction having a lower density than the liquid phase and to obtain a liquid phase as the third phase. The two solid phases are discharged with a residual moisture content in the range from 2 to 25% by weight, depending on the consistency of the particles. The heaviest solid fraction obtained in the first separating stage usually consists principally of mineral fillers, for example synthetic rubber to which chalk has been added, and contains only small amounts of fiber material. After drying, this fraction can be passed to thermal energy recovery or material recycling.

A refinement of the invention consists in that the polymer fiber material of the comminuted carpet pieces consists at least partly of polyamide fiber material, and in that the second high-solids phase, calculated in dry form, consists of at least 50% by weight of polyamide fiber material. A polymer fiber material-rich phase which consists of at least 90% by weight of polyamide fiber material is preferably withdrawn from the second separating stage. This polyamide fiber material can be re-used without difficulties, since it has the requisite purity for use, for example, as raw material in recycling methods.

Embodiments of the process are explained with the aid of the drawing, which shows a flow chart of the process.

BRIEF DESCRIPTION OF THE DRAWINGS

The carpet waste to be processed is fed, on transport route (1), firstly to a precomminution step (2), for example a shredder. The pre-comminuted material then passes either on transport route (2*a*) to a hammer mill (3) or on transport route (2*b*) directly to fine comminution in a cutting mill (5). The carpet material passing through the hammer mill (3), which is usually soiled to a relatively great extent, is passed through line (6) to a sieve (7), which has mesh widths approximately in the range of 3–10 mm. The dirt adhering to the carpet is separated off together with a fraction of chalk and removed through line (8), and the carpet pieces pass on route (7*a*) to the cutting mill (5). The route via the hammer mill (3) and the sieve (7) has the advantage that wear-promoting dirt, for example sand, is removed before entry into the fine comminution step. Furthermore, the material flow coming from the shredder (2) is reduced. This enables subsequent plant parts to be built smaller, and subsequent losses of salt and water which occur via the residual moisture content of the solids are reduced.

The discharge from the cutting mill takes place via a perforated plate with holes approximately in the range of about 3–10 mm, preferably 4–8 mm. Due to the comminution, substantially complete separation of the carpet composite takes place. The comminution can be carried out either in dry or wet form, depending on the degree of soiling of the raw material. In the latter case, water is supplied through line (5*a*) and soiled water is discharged through line (5*b*).

Figure 1:
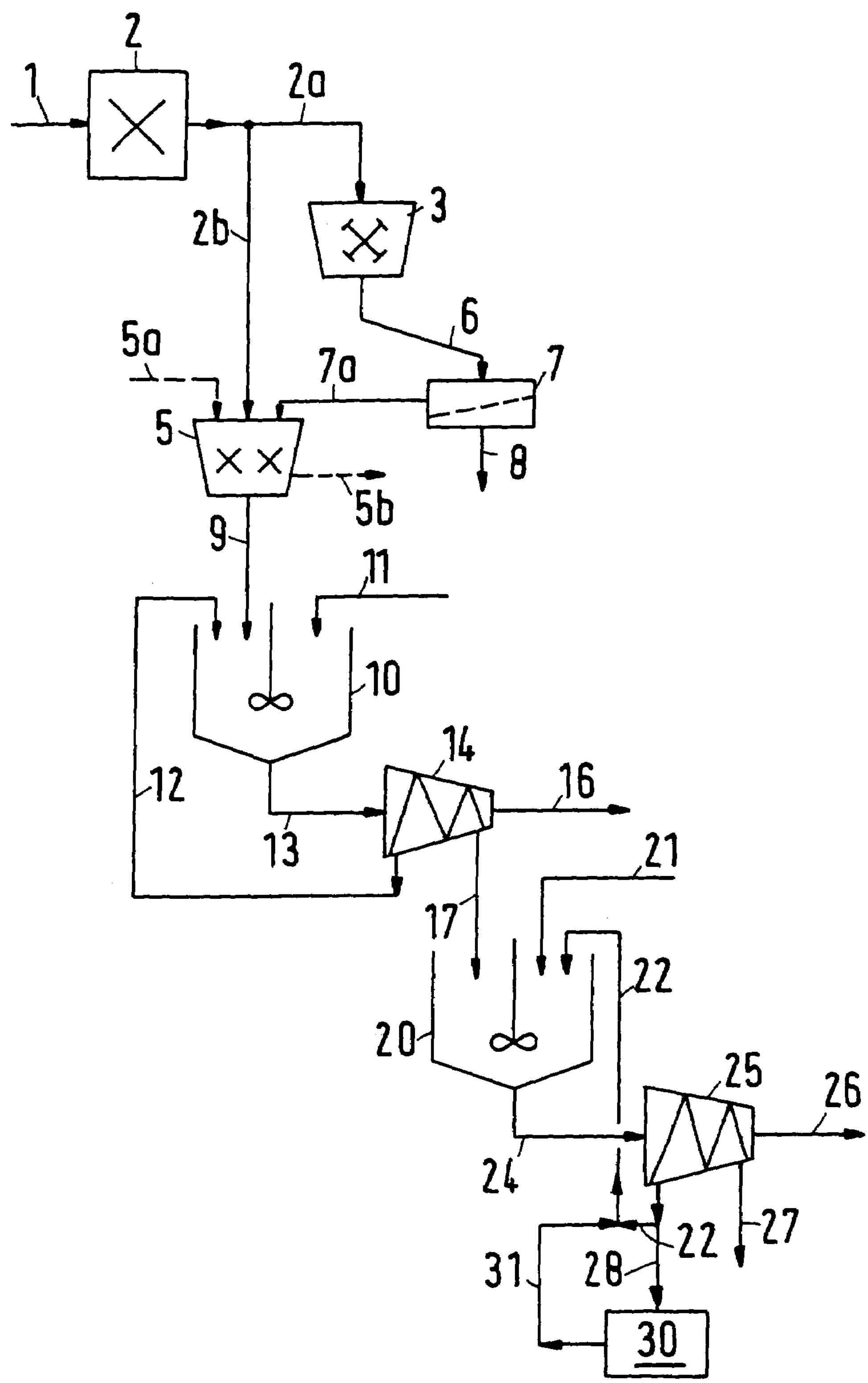

Comminuted carpet material having piece sizes approximately in the range of 3–20 mm is passed through line (9) to a first stirred tank (10), to which a first aqueous solution containing separating salt is also added through line (11). A first liquid phase which is fed back is likewise introduced into tank (10) through line (12). A first suspension is produced, which is fed to a first separating stage (14) through line (13). The first suspension has a solids content of usually 1–15% by weight, and the density of the liquid phase in the case of recovery of polyamide fiber material is usually in the range of 1.16–1.2 kg per liter.

From the first separating stage (14), a first high-solids phase, which is the heavy phase containing rubber and chalk, is withdrawn through line (16). The second high-solids phase, which contains the polymer fiber material to be recovered, is withdrawn in line (17) and introduced into a second stirred tank (20). The liquid phase likewise formed in the first separating stage is fed back in line (12).

An aqueous, acid-containing separation solution is fed to the second tank (20) through line (21), and a recycled liquid phase coming from line (22) is also introduced into tank (20). The acid is stronger than $H_2CO_3$ in order that it readily dissolves chalk in particular. A suspension whose liquid has a pH of 2–6, so that, inter alia, all the calcium compounds dissolve, is produced in tank (20). The suspension produced passes through line (24) with a solids content of 1–15% by weight into the second separating stage (25), which, like the first separating stage (14), can be a double-cone full-jacket centrifuge. The density of the liquid in the suspension in line (24) is usually 1.0–1.12 kg per liter in the case of the recovery of polyamide fiber material. The heavier high-solids phase, which usually consists of pile fibers, is withdrawn from the second separating stage through line (26). This material can be fed to a depolymerization plant. The desired, polymer fiber material-rich phase, which may consist, for example, of at least 90% by weight of polyamide fibers, is obtained in line (27). The liquid phase likewise separated off is partly fed back in line (22), and a certain proportion thereof can be removed from the process through line (28) and fed to purification (30), for example a thickener. Purified aqueous separation solution is fed back in line (31). The soiled water formed in line (5*b*) can also be introduced into the thickener (30).

EXAMPLE 1

Use is made of a plant corresponding to the drawing, to which are fed 50 kg of carpet having the following composition through transport route (1):

| | |
|---|---|
| Pile material comprising polyamide fibers (PA) | 35% by weight |
| Polypropylene as backing fabric (PP) | 7% by weight |
| Foam backing of chalk-containing styrene-butadiene latex (SBR) | 55% by weight |
| Dirt | 3% by weight |

The carpet is pre-comminuted in a shredder (2) fitted with a 90 mm sieve. The dirt adhering to the pieces and other fine fraction are subsequently mechanically loosened by means of a hammer mill (3). The carpet is passed via transport route (6) to the sieving machine (7). This separation device is fitted with a sieve having a mesh width of 5 mm. 2.6 kg of dirt and other fine fraction are separated off from the underflow.

The shredded carpet from the top flow of the sieving machine is passed to the cutting mill (5), which is fitted with a perforated plate having square holes with a diameter of 6 mm. The carpet is finely comminuted in dry form in this device. The ground carpet is passed via line (9) to the stirred tank (10). The tank contains 900 kg of a separation solution set to a density of 1.17 kg/l by means of $Ca(NO_3)_2$, some of which has been initially introduced via line (12). In order to set the density, the solution contains 194 kg of $Ca(NO_3)_2$. The suspension prepared is passed via line (13) to a double-cone full-jacket screw centrifuge (14).

The first high-solids phase (dry weight: 26.2 kg) is discharged with a residual moisture content of 22% by weight through line (16) and the second high-solids phase (dry weight: 21.1 kg) is discharged with a residual moisture content of 12% by weight through line (17), and the separation solution (12) is fed back into the stirred tank (10). The second high-solids phase is introduced into the second stirred tank (20) and suspended in 399 kg of water. 2.4 kg of nitric acid (21) having a concentration of 50% are added to the suspension prepared in the stirred tank (20), to give a pH of 4.

The suspension prepared is introduced into the second separating stage (25) via line (24). The third high-solids phase (dry 4.7 kg) is discharged with a residual moisture content of 14% by weight through line (27), and the fourth high-solids phase (dry 16.4) is discharged with a residual moisture content of 16% by weight through line (26). The separation solution (22) is partly fed back into the stirred tank (20), and a sub-stream (28) of 40 kg is removed and fed to the thickener (30). After clarification and removal of 0.1 kg of impurities, re-introduction into the separation circuit in the 2nd stage (line (31)) takes place.

The individual high-solids phases have the following composition, based on the dry matter:

| | PA | PP | SBR | Dirt |
|---|---|---|---|---|
| First high-solids phase | 3.4% by wt. | 0.1% by wt. | 94.8% by wt. | 1.7% by wt. |
| Second high-solids phase | 77.8% by wt. | 16.2% by wt. | 5.9% by wt. | 0.1% by wt. |
| Third high-solids phase | 8.7% by wt. | 90.3% by wt. | 1.0% by wt. | 0.0% by wt. |
| Fourth high-solids phase | 98.2% by wt. | 0.2% by wt. | 1.5% by wt. | 0.1% by wt. |
| Sieve residue | 6.6% by wt. | 1.3% by wt. | 52.2% by wt. | 39.8% by wt. |

EXAMPLE 2

Use is likewise made of a plant corresponding to the drawings to which 50 kg of carpet having the following composition are fed through transport route (1):

| | |
|---|---|
| Pile material comprising polyamide fibers (PA) | 35% by weight |
| Polypropylene as backing fabric (PP) | 7% by weight |
| Foam backing of chalk-containing styrene-butadiene latex (SBR) | 57% by weight |
| Dirt | 1% by weight |

The carpet is pre-comminuted in a shredder (2) as in Example 1. The shredded carpet is subsequently passed via line (2*b*) to the cutting mill (5). The cutting mill is fitted with a perforated plate having square holes with a diameter of 6 mm. The carpet is finely comminuted in this device with addition of 200 kg of water. 150 kg of water and 1.0 kg of dirt are discharged from the mill and fed via line (5*b*) to the thickener (30). 50 kg of water remaining in the raw material are fed to the stirred tank (10) together with the ground carpet via line (9). A separation solution prepared by means of $Ca(NO_3)_2$ is initially introduced into the tank via line (12) and is set to the density 1.17 kg/l by means of the 50 kg of water introduced from the mill, giving a total amount of 931 kg of separation solution. In order to set the density, the solution contains 201 kg of $Ca(NO_3)_2$. The suspension prepared is fed via line (13) to a double-cone full-jacket screw centrifuge (14). The first high-solids phase (dry weight: 27.8 kg) is withdrawn with a residual moisture content of 22% by weight through line (16), and the second high-solids phase (dry weight: 21.2 kg) is introduced with a residual moisture content of 12% by weight through line (17) into the second stirred tank (20), where it is suspended in 400 kg of water. The separation solution from line (12) is fed back into the stirred tank (10).

2.6 kg of nitric acid having a concentration of 50% are added to the suspension prepared in the stirred tank (20), and the pH is set to 3.5. The suspension prepared is introduced into the second separating stage (25) via line (24). The third high-solids phase (dry 4.8 kg) is discharged with a residual moisture content of 14% by weight into line (27), and the fourth high-solids phase (dry 16.4) is withdrawn with a residual moisture content of 16% by weight in line (26).

The separation solution (22) is fed back into the stirred tank (20). A sub-stream (28) of 40 kg is removed and fed to the thickener (30). After clarification and removal of 1.1 kg of impurities, re-introduction into the separation circuit in the 2nd stage takes place through line (31). To this is added 150 kg of water, introduced into the thickener through line (5*b*).

The individual high-solids phases have the following composition, based on the dry matter:

| | PA | PP | SBR | Dirt |
|---|---|---|---|---|
| First high-solids phase | 3.2% by wt. | 0.1% by wt. | 95.9% by wt. | 0.7% by wt. |
| Second high-solids phase | 77.5% by wt. | 16.2% by wt. | 6.3% by wt. | 0.0% by wt. |
| Third high-solids phase | 8.7% by wt. | 90.2% by wt. | 1.1% by wt. | 0.0% by wt. |
| Fourth high-solids phase | 98.2% by wt. | 0.2% by wt. | 1.6% by wt. | 0.0% by wt. |

We claim:

1. Process for separating polymer fiber material from comminuted carpet pieces, in which said comminuted carpet pieces are fed to a first stirred tank together with an aqueous solution containing separating salt, a first suspension is withdrawn from said first stirred tank and fed to a first mechanical separating stage, a first high-solids phase, a second high-solids phase containing polymer fiber material, and a liquid phase are separated off in the first mechanical separating stage, the separated second high-solids phase is mixed with a water-containing separation solution in a second stirred tank, and a second suspension is withdrawn from the second stirred tank and fed to a second mechanical separating stage, a third high-solids phase, a polymer fiber material-rich phase, and a liquid phase are separated; off from the second mechanical separating stage, and wherein an acid which is stronger than $H_2CO_3$ is introduced into the second stirred tank together with the water-containing separation solution, and the pH of the liquid in the second stirred tank is maintained at 2–6.

2. Process according to claim 1, wherein the separating salt fed to the first stirred tank is a calcium salt whose acid dissolves calcium carbonate.

3. Process according to claim 1, wherein the polymer fiber material of the comminuted carpet pieces is comprised at least partly of polyamide fiber material, the second high-solids phase, calculated in dry form, is comprised of at least 50% by weight of polyamide fiber material, and the polymer fiber material-rich phase coming from the second mechanical separating stage is comprised of at least 90% by weight of polyamide fiber material.

4. Process according to claim 1, wherein the carpet pieces to be processed come from dry comminution or wet comminution.

5. Process according to claim 2, wherein the polymer fiber material of the comminuted carpet pieces is comprised at least partly of polyamide fiber material, the second high-solids phase, calculated in dry form, is comprised of at least 50% by weight of polyamide fiber material, and the polymer fiber material-rich phase coming from the second mechanical separating stage is comprised of at least 90% by weight of polyamide fiber material.

6. Process according to claim 2, wherein the carpet pieces to be processed come from dry comminution or wet comminution.

* * * * *